United States Patent
Matsui

(10) Patent No.: US 9,071,348 B2
(45) Date of Patent: Jun. 30, 2015

(54) OPTICAL TRANSMISSION APPARATUS AND OPTICAL TRANSMISSION METHOD

(71) Applicant: FUJITSU LIMITED, Kawasaki-shi (JP)

(72) Inventor: Jun Matsui, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 176 days.

(21) Appl. No.: 13/732,876

(22) Filed: Jan. 2, 2013

(65) Prior Publication Data

US 2013/0236168 A1 Sep. 12, 2013

(30) Foreign Application Priority Data

Mar. 6, 2012 (JP) ................................. 2012-049494

(51) Int. Cl.
  *H04B 10/03* (2013.01)
  *H04B 10/032* (2013.01)
(52) U.S. Cl.
  CPC .............. *H04B 10/03* (2013.01); *H04B 10/032* (2013.01)
(58) Field of Classification Search
  CPC ............................ H04B 10/03; H04B 10/032
  USPC ............................................. 370/535; 398/9
  See application file for complete search history.

(56) References Cited

U.S. PATENT DOCUMENTS

| | | | | | |
|---|---|---|---|---|---|
| 5,426,644 | A | * | 6/1995 | Fujimoto | 370/535 |
| 6,226,111 | B1 | * | 5/2001 | Chang et al. | 398/9 |
| 7,340,163 | B2 | * | 3/2008 | Hardee | 398/4 |
| 7,613,391 | B2 | * | 11/2009 | Tajima | 398/5 |
| 8,175,455 | B2 | * | 5/2012 | Takeshita et al. | 398/29 |
| 2009/0290870 | A1 | * | 11/2009 | Koyano et al. | 398/25 |
| 2011/0170861 | A1 | * | 7/2011 | Ding et al. | 398/25 |
| 2012/0163802 | A1 | * | 6/2012 | Kim et al. | 398/17 |

FOREIGN PATENT DOCUMENTS

JP 2007-060494 3/2007

* cited by examiner

*Primary Examiner* — David Payne
*Assistant Examiner* — Omar S Ismail
(74) *Attorney, Agent, or Firm* — Fujitsu Patent Center

(57) ABSTRACT

An optical transmission apparatus includes a transmitter that transmits to a counterpart receiver via a transmission path and transmits as optical signals for a plurality of channels, input signals for a plurality of channels; and a controller that when a transmission failure between the transmitter and the receiver is detected, distributes to properly operating channels, data for a channel subject to the transmission failure, increases a transmission rate for the properly operating channels to a given transmission rate, and continues data transmission for all channels including the channel subject to the transmission failure.

18 Claims, 16 Drawing Sheets

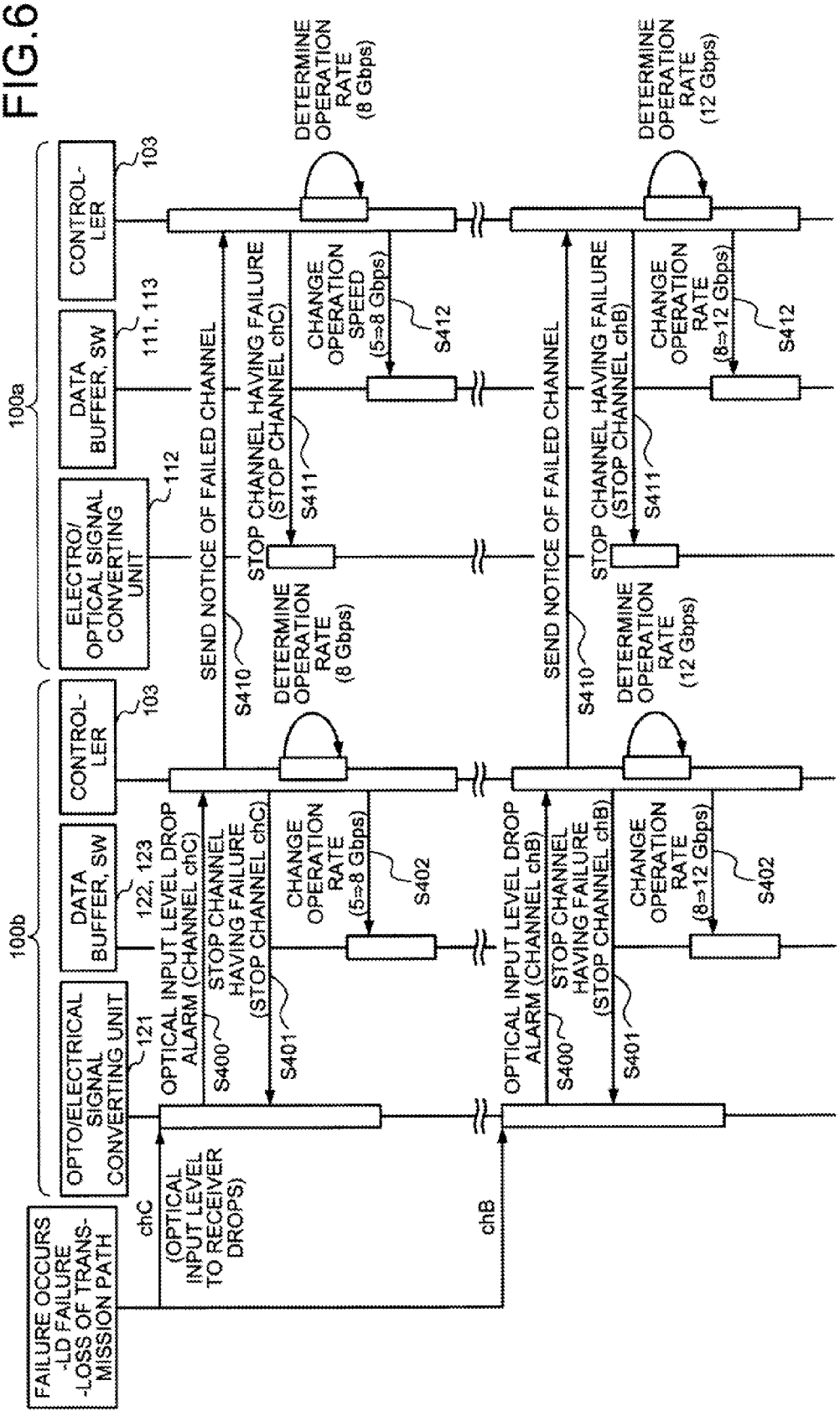

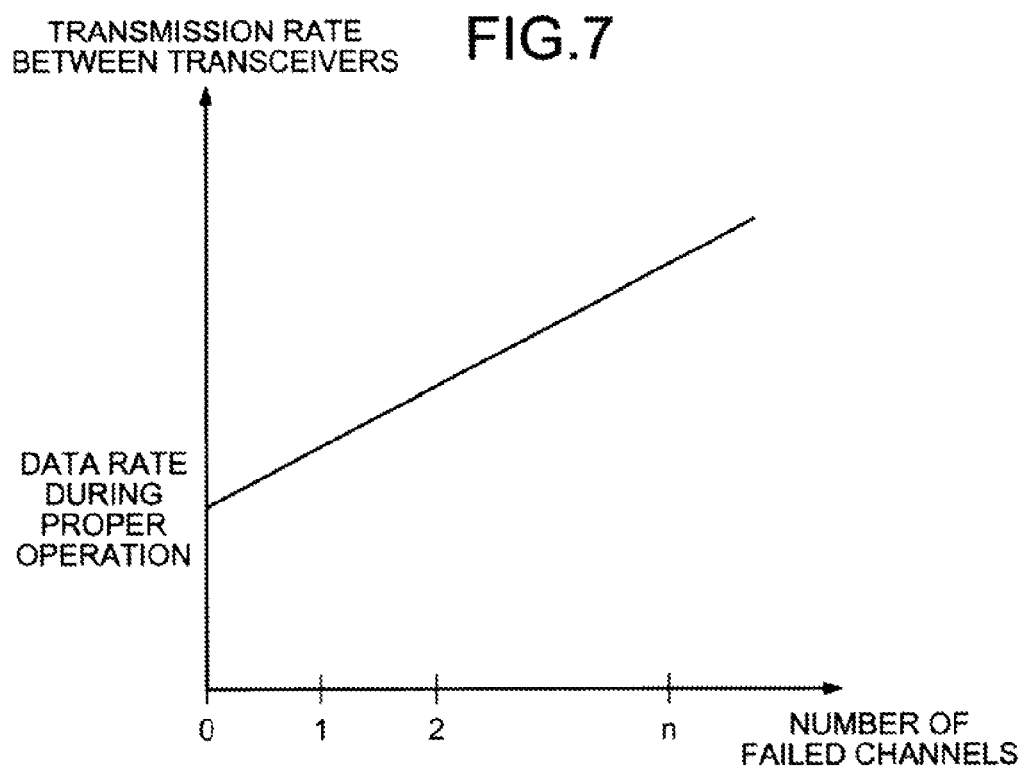

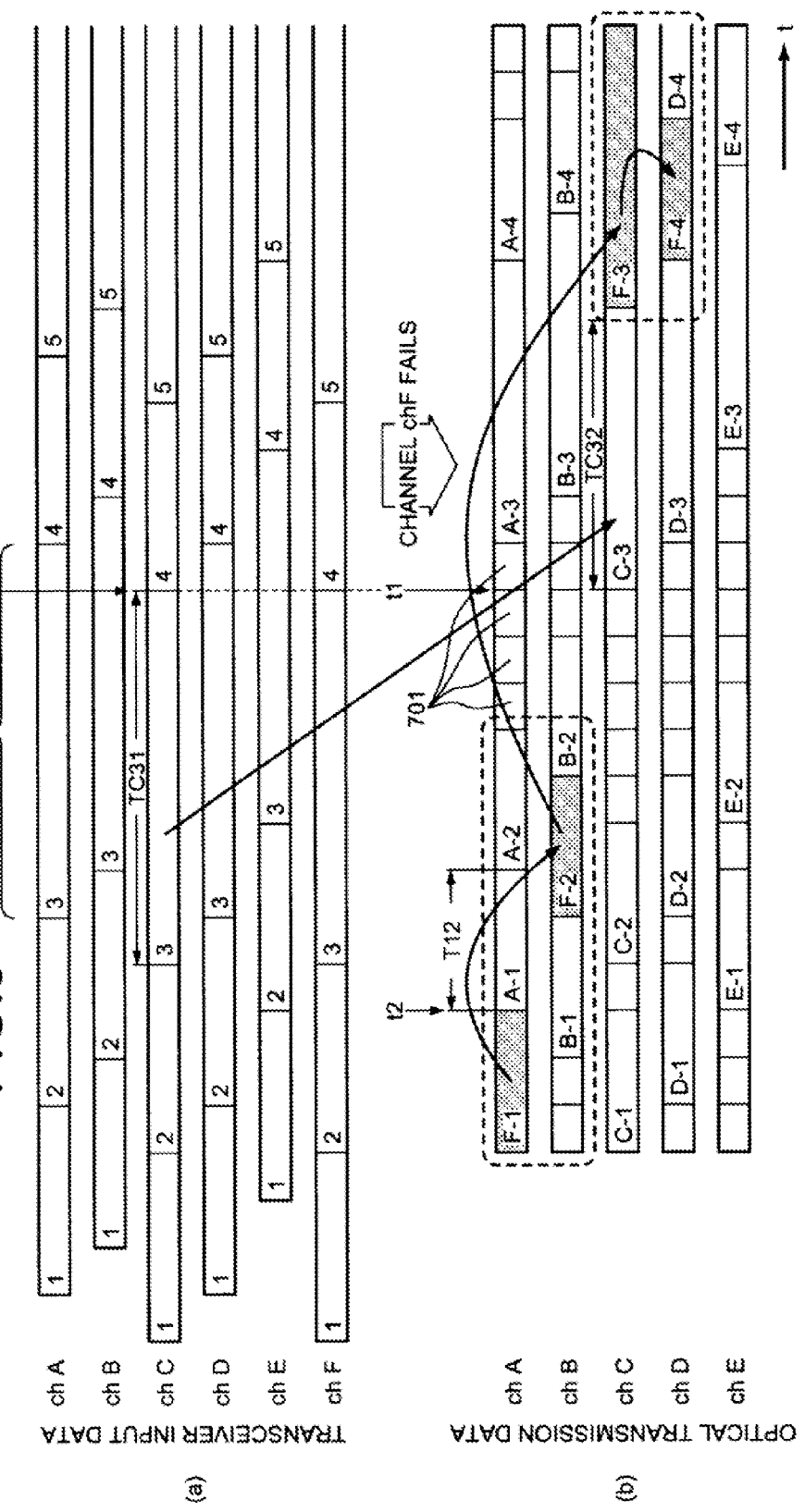

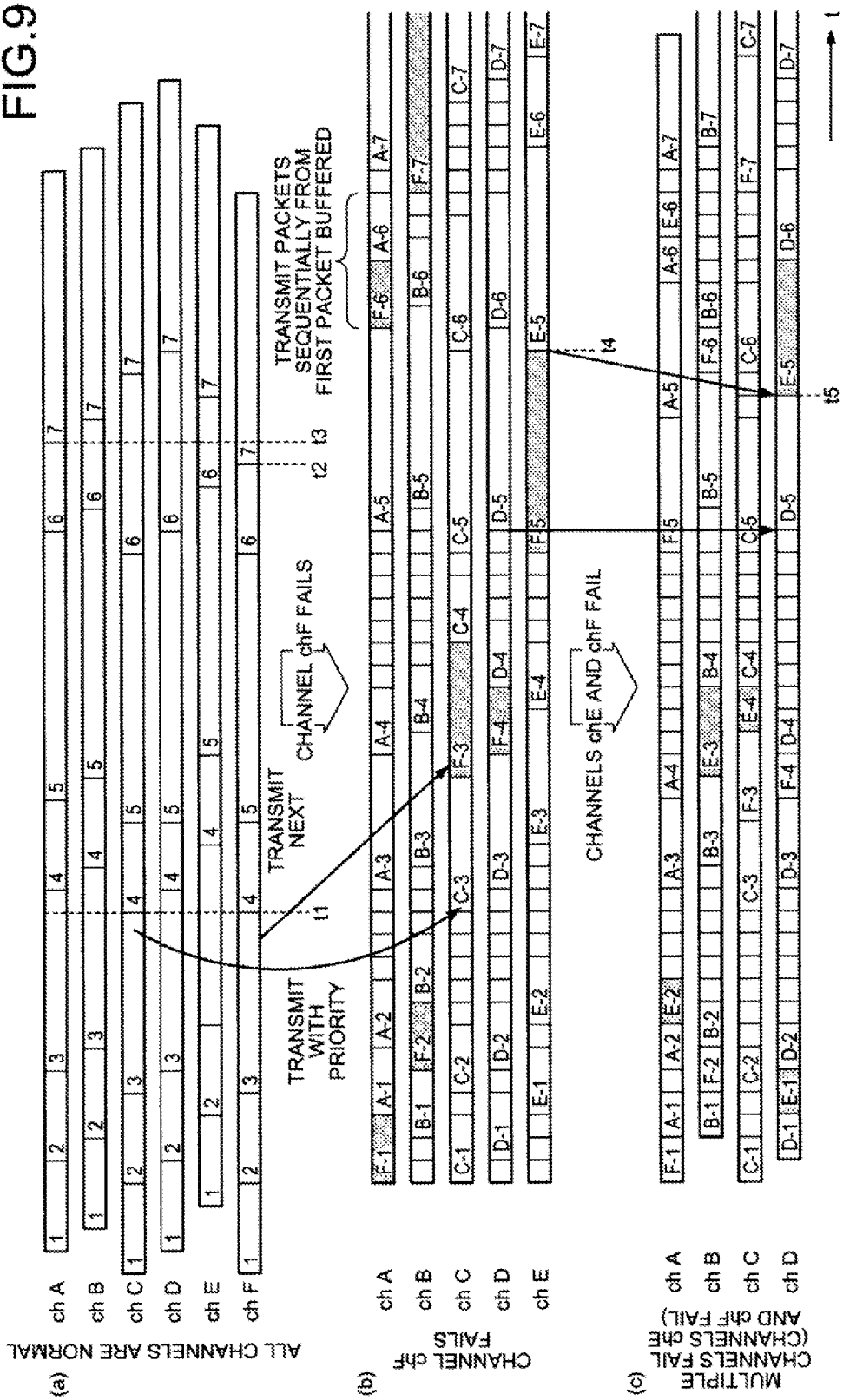

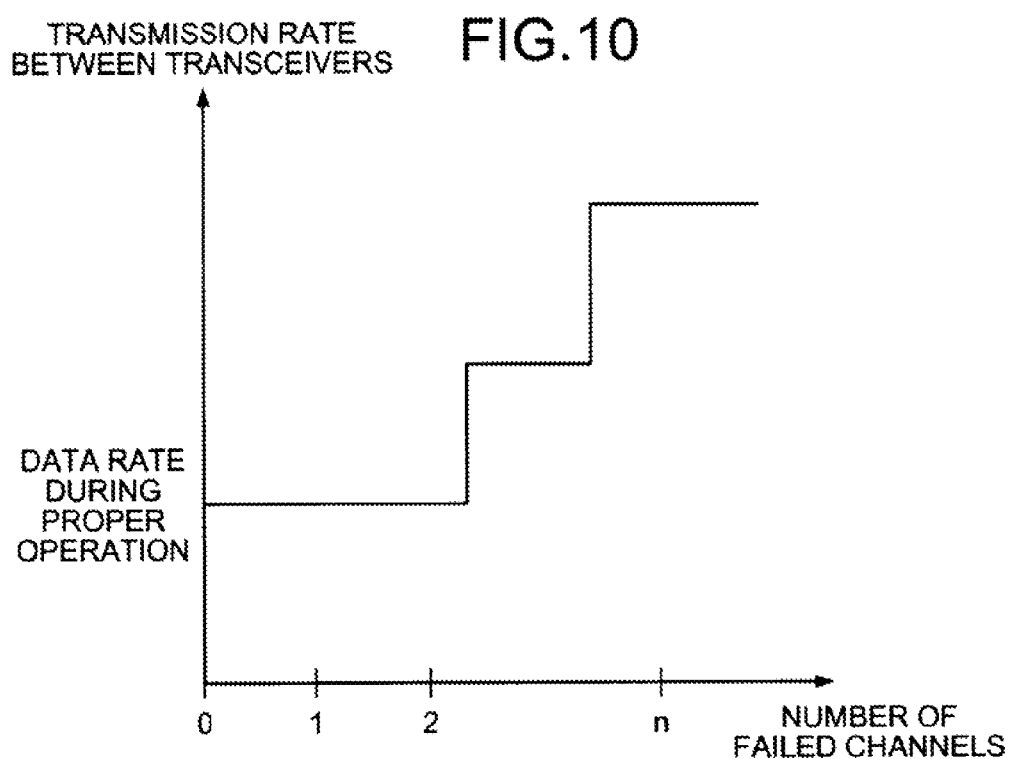

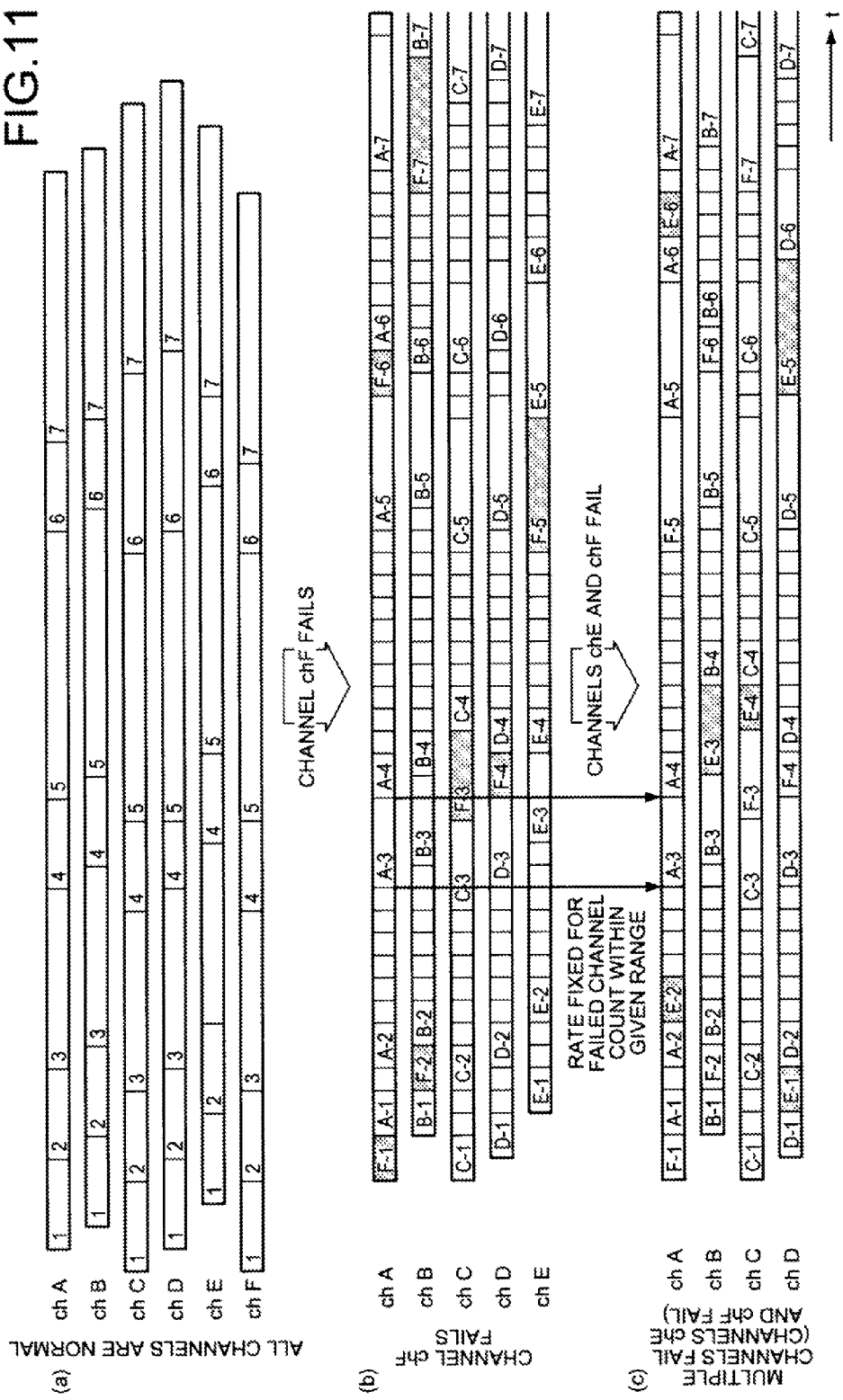

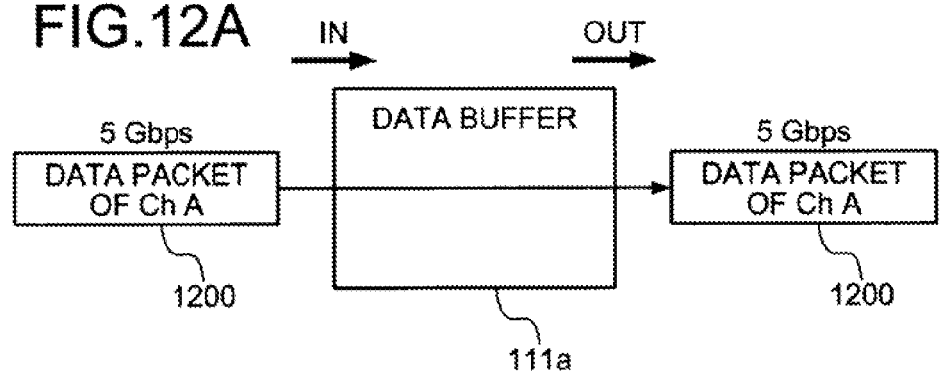

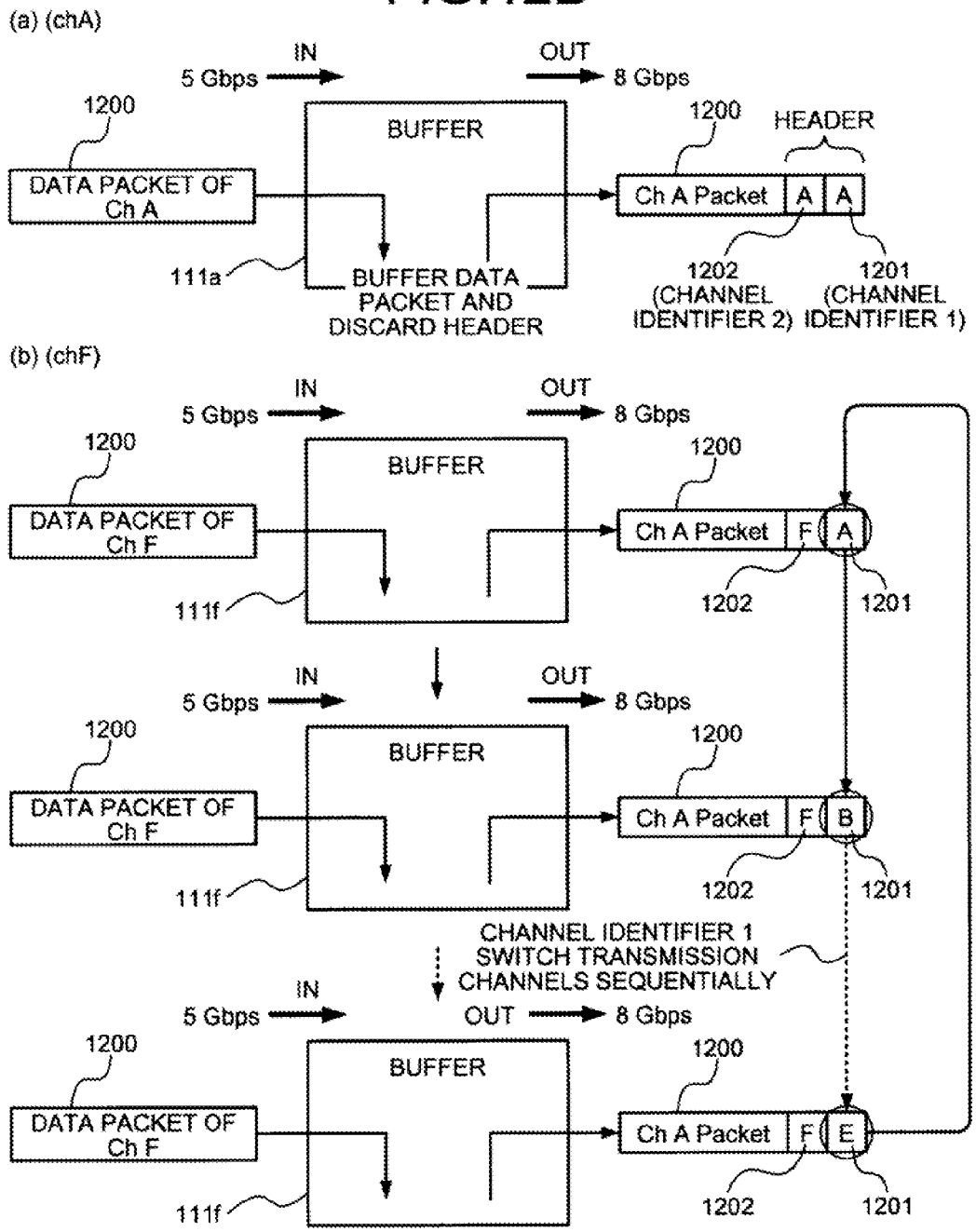

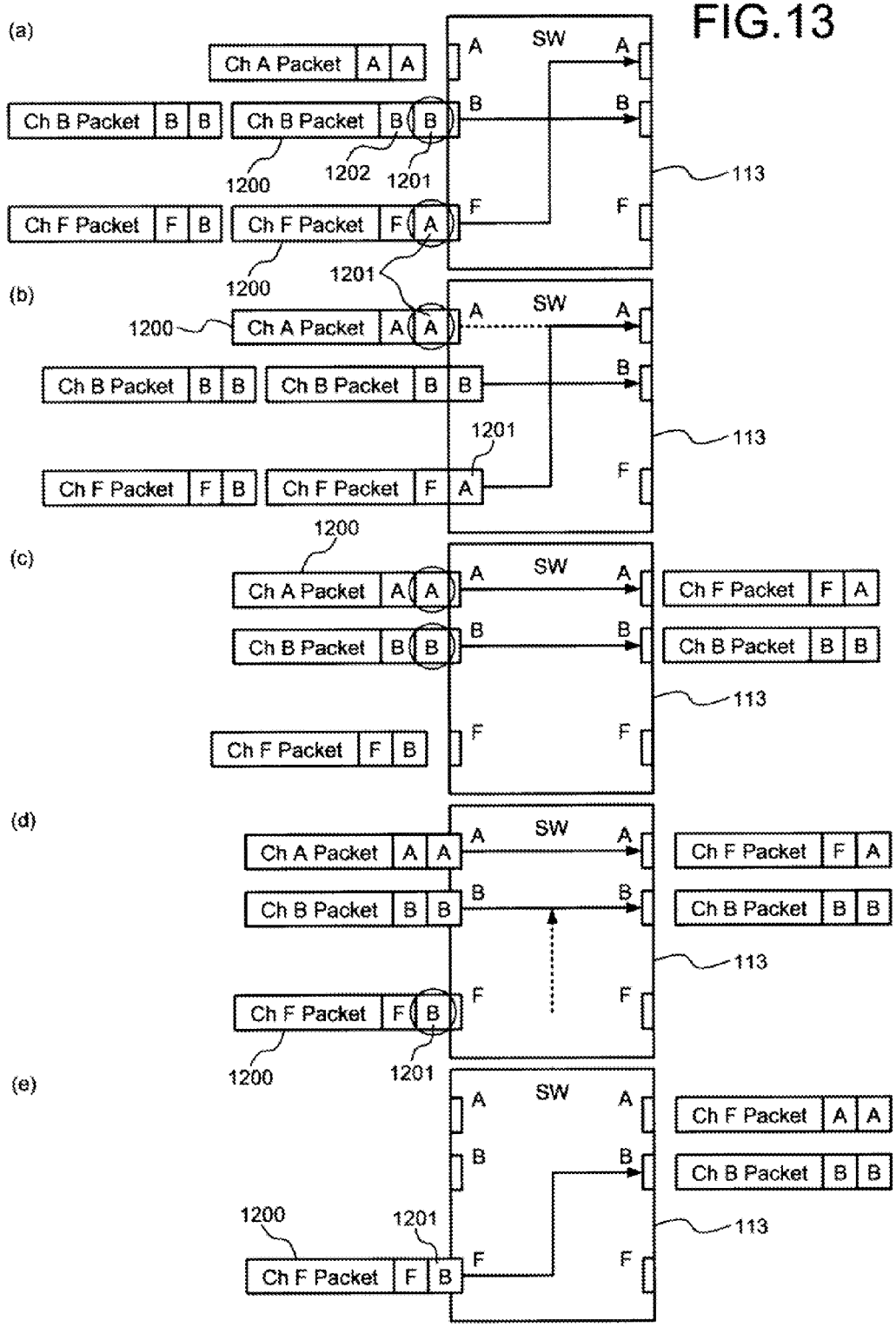

FIG.14
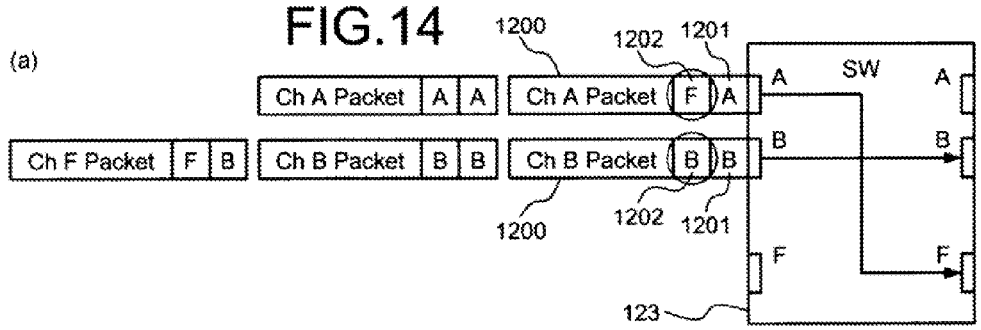
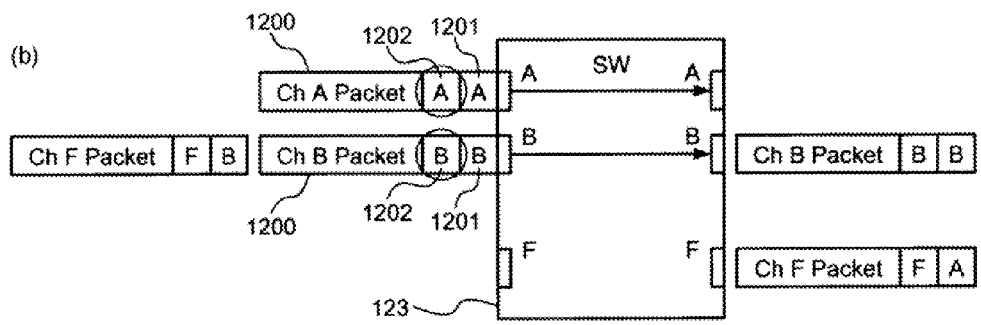
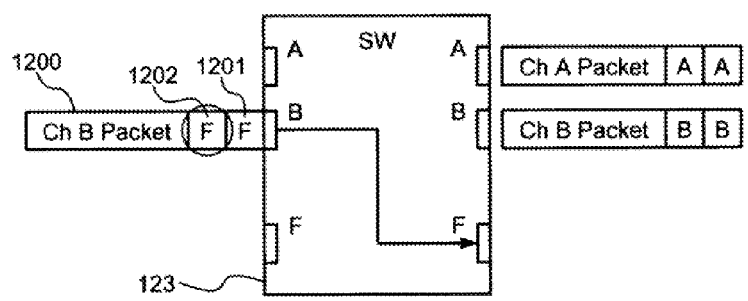
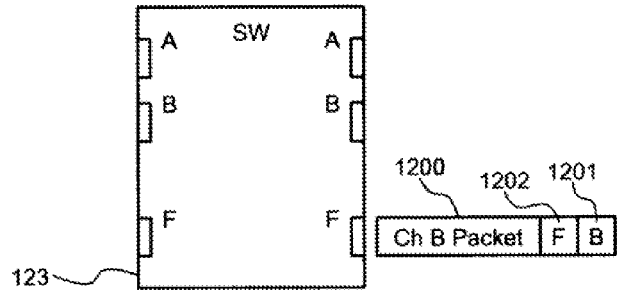

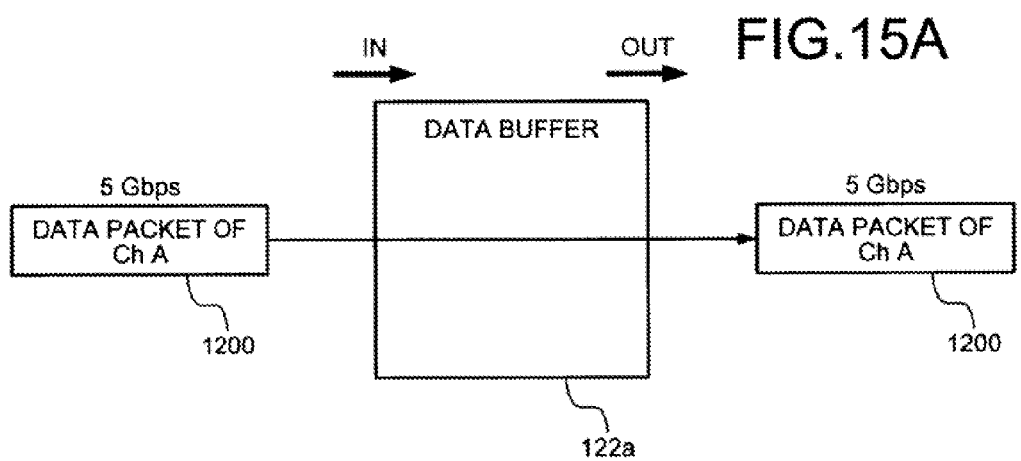
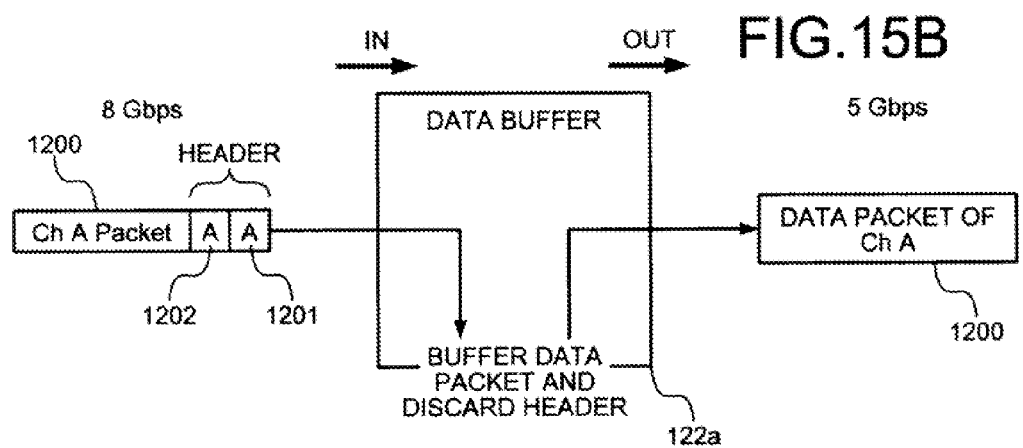

… (1)

OPTICAL TRANSMISSION APPARATUS AND OPTICAL TRANSMISSION METHOD

CROSS REFERENCE TO RELATED APPLICATIONS

This application is based upon and claims the benefit of priority of the prior Japanese Patent Application No. 2012-049494, filed on Mar. 6, 2012, the entire contents of which are incorporated herein by reference.

FIELD

The embodiment discussed herein is related to an optical transmission apparatus and optical transmission method that transmit optical signals.

BACKGROUND

In recent years, accompanying increases in communication capacity, optical communication systems using optical signals have come into wide use. Optical parallel transmission, by which data is transmitted/received using multiple channels, allows expansion of the data transmission bandwidth, leading to a broader range of applications of optical communication. However, such optical communication, which differs from transmission using electrical signals, tends to require a greater number of components for the transmission system. In addition, because optical components are less reliable than electrical components, communication failures are likely to occur more frequently in optical communication than in electrical transmission.

A server, etc., that processes data using an optical communication system operates on the assumption that the optical communication system continuously operates. For this reason, if a failure occurs in a certain channel of the optical communication system, it is impossible to immediately stop the optical communication system and replace a faulty optical component. To deal with the occurrence of failures, the optical communication system has to have redundancy so that operation can continue while maintaining a fixed transmission quality until the next maintenance period arrives.

Some methods of ensuring system redundancy in optical parallel transmission are known. For example, one method is to provide, in advance, a backup channel and when failure occurs, switch from the failing channel to the backup channel. Another method is to perform optical parallel transmission through multiple channels and when failure occurs, to transmit data for the failing channel through a channel operating normally (see, e.g., Japanese Laid-Open Patent Publication No. 2007-60494).

However, with the method mentioned first, a problem arises in that providing the backup channel used exclusively for a backup purpose and not used under normal situations results in increased initial construction cost. Furthermore, if the number of channels that fail exceed the number of the backup channels, a further problem arises in that the backup channel cannot accommodate data for the failed channels and thus, becomes incapable of data transmission. According to the method mentioned second, because all data for the failing channel is concentrated in the channels operating normally, the transmission band gets narrower as the number of failing channels increases.

SUMMARY

According to an aspect of an embodiment, an optical transmission apparatus includes a transmitter that transmits to a counterpart receiver via a transmission path and transmits as optical signals for a plurality of channels, input signals for a plurality of channels; and a controller that when a transmission failure between the transmitter and the receiver is detected, distributes to properly operating channels, data for a channel subject to the transmission failure, increases a transmission rate for the properly operating channels to a given transmission rate, and continues data transmission for all channels including the channel subject to the transmission failure.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a sequence diagram of an overall control process executed by an optical communication system when channel failure occurs;

FIG. 7 is a graph indicating control for changing a transmission rate between transceivers;

FIG. 8 is a timing chart of an example of distribution of data for a failed channel;

FIG. 9 is a timing chart of an example of data distribution for a failed channel;

FIG. 10 is a graph of another example of control for changing the transmission rate between the transceivers;

FIG. 11 is timing chart of another example of data distribution for a failed channel;

FIG. 12A is an explanatory diagram of an operation of a data buffer of a transmitter during proper operation;

FIG. 12B is an explanatory diagram of an operation of the data buffer of the transmitter at the time of occurrence of a channel failure;

FIG. 13 depicts operation of a switching element of the transmitter;

FIG. 14 depicts operation of the switching element of a receiver; and

FIGS. 15A and 15B are explanatory diagrams of operation of a data buffer of the receiver.

DESCRIPTION OF EMBODIMENTS

Figure 1:
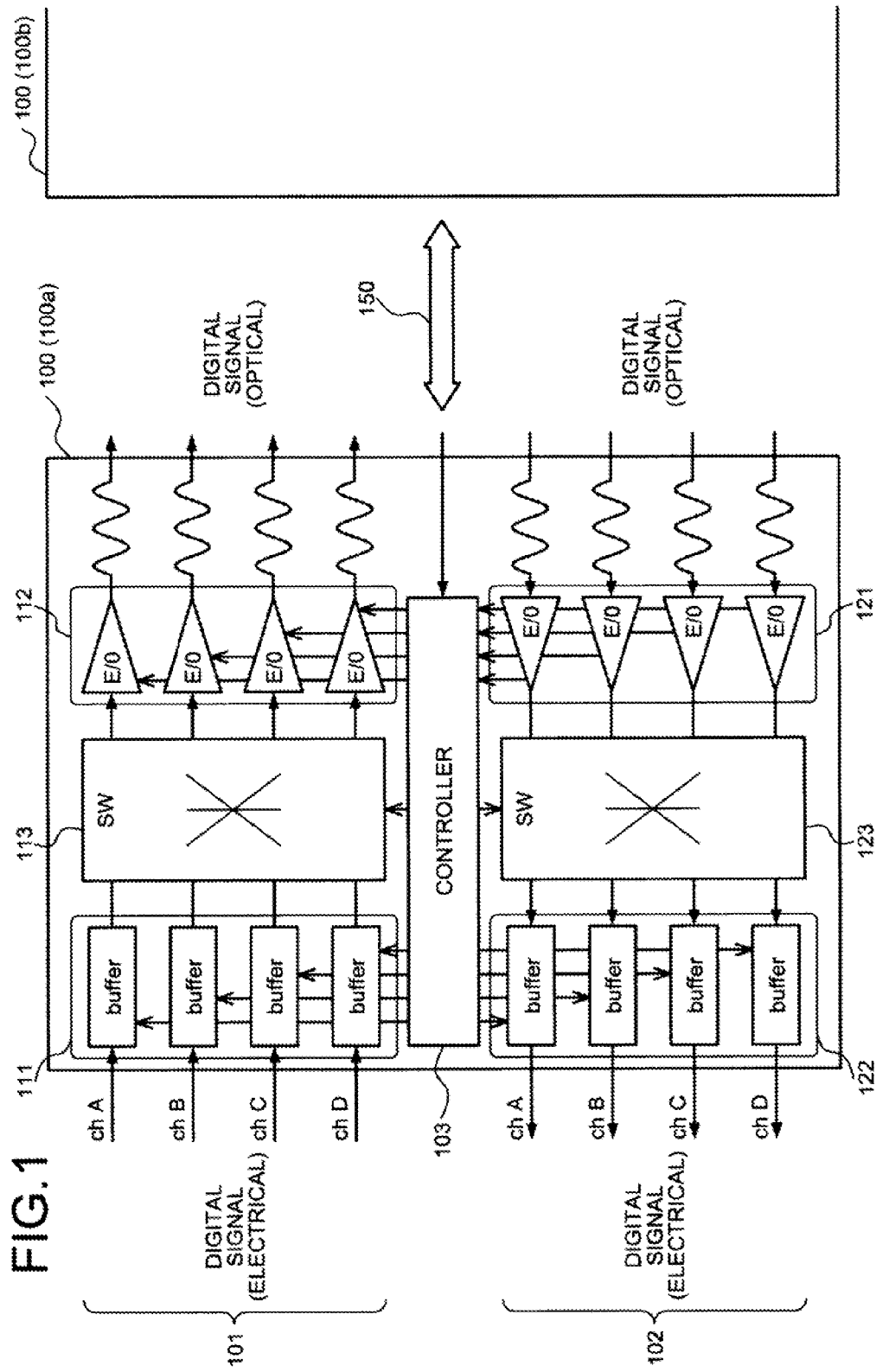
FIG. 1 depicts a configuration of an optical transmission apparatus according to an embodiment.

Preferred embodiments of will be described in detail with reference to the accompanying drawings. FIG. 1 depicts a configuration of an optical transmission apparatus according to an embodiment. Hereinafter, a transceiver 100 that transmits/receives data in the form of optical signals will be described as an example of the optical transmission apparatus. The same transceiver 100 is provided as a transmission-side transceiver and as a reception-side transceiver. Between a paired transceiver 100*a* and transceiver 100*b* communication, counterparts of each other, data transmission (reception) is performed between a transmitter and a receiver via an optical transmission path 150, such as an optical fiber.

The transceiver 100 (100a) of FIG. 1 includes a transmitter 101, a receiver 102, and a controller 103. The transmitter 101 and the receiver 102 each have multiple channels (ch). In FIG. 1, each unit has four channels, enabling data transmission through four channels. While the number of channels is four in FIG. 1, the technique disclosed herein puts no limit to the number of channels.

The transmitter 101 includes multiple data buffers 111 that temporarily save an electrical signal for each channel, electro/optical signal converting units 112 that convert an electrical signal from each channel into an optical signal, and a switching element 113 that switches the routes of channels of the data buffers 111 and outputs data through the switched route to the electro/optical signal converting units 112. Each electro/optical signal converting unit 112 includes, for example, a semiconductor laser (laser diode (LD)) serving as a light-emitting element and a driver IC that drives the LD, and has a function of converting an electrical signal into an optical signal.

Similar to the transmitter 101, the receiver 102 has individual units for data reception through multiple (four) channels. The receiver 102 includes opto/electrical signal converting units 121, multiple data buffers 122, and a switching element 123 that switches routes when failure occurs. Each opto/electrical signal converting unit 121 includes, for example, a photodiode (PD) serving as a light-emitting element, a trans impedance amplifier (TIA), and a limiting amplifier, and has a function of converting an optical signal into an electrical signal.

The controller 103 controls data transmission/reception by the transceiver 100. Under proper operation, the controller 103 performs data transmission/reception through each channel at a specified data rate, at which the switching element 113 does not perform route switching. When failure occurs, such as data transmission becoming impossible at a certain channel (transmission failure), the controller 103 distributes data for the failing channel to channels that can transmit/receive that data, thereby causes data transmission/reception to continue. The controller 103 establishes a given transmission bandwidth during proper operation and during an occurrence of a failure.

Under proper operation, for example, the controller 103 causes the transmission-side transceiver 100a to perform data transmission/reception using the same channel without switching a channel. In FIG. 1, an electrical signal input to a channel chA of the transmitter 101 travels through the switching element 113 not performing channel switching and is input to the electro/optical signal converting unit 112 for the channel chA, and is output as an optical signal for the channel chA to the optical transmission path 150. At the reception-side transceiver 100b, the receiver 102 receives the optical signal for the channel chA.

The receiver 102 of the reception-side transceiver 100b at the reception side in data transmission/reception detects a failed channel and notifies the transmission-side transmission unit 101 of the failed channel. Such failure arises as a result of loss of the optical transmission path 150 between the pair of transceivers 100a and 100b, and failure of the LD incorporated in the electro/optical signal converting unit 112 of the transmitter 101 of the transmission-side transceiver 100a. The occurrence of such failure leads to a drop in the level of the input optical signal received by the PD, etc. incorporated in the opto/electrical signal converting unit 121 of the receiver 102 of the reception-side transceiver 100b. As a result, an optical input level drop alarm for the failed channel is output to the controller 103.

The controller 103 of the reception-side transceiver 100b stops data transmission by the failed channel, and performs control for receiving data from the failed channel using other properly operating channels. At this time, the controller 103 performs control for increasing the operation frequencies of the data buffers 122 and the switching element 123 for the properly operating channels of the receiver 102 in the reception-side transceiver 100b. In addition, the controller 103 sends information of the failed channel to the counterpart transmission-side transceiver 100a.

At the transmission-side transceiver 100a, when the controller 103 receives the information of the failed channel, the controller 103 performs control for distributing data for the failed channel to other properly operating channels to transmit the distributed data through the properly operating channels. The controller 103 thus controls the switching element 113 to execute a switching operation for outputting data for the failed channel to the properly operating channels.

The controller 103 of the transmission-side transceiver 100a increases the data rate of properly operating channels by a rate corresponding to the number of failed channels. At this time, the controller 103 performs control for increasing the operation frequencies of the switching element 113 and the data buffers 122 for the properly operating channels.

As described, when a certain channel fails, the transmission-side transceiver 100a and reception-side transceiver 100b perform control for equally increasing respective operation frequencies in synchronization with each other. For this reason, in the transceiver 100 (100a, 100b), an element that can operate at a data transmission rate higher than a specified data transmission rate is used as the circuit element of the transmitter 101 and that of the receiver 102. The operating speed of such a circuit element is set according to not only the transmission rate of input data but also according to the ratio of the number of failed channels to the total number of channels (number of links). (This will be described later.)

Generally, the opto/electrical signal converting unit 121 can operate at multiple rates and thus, operates according to the data rate of incoming data if the data rate is within an operable data rate range. When one channel fails, data for the failed channel is distributed to one or more of the remaining three channels. At this time, a transmission band between the transceiver 100a and the transceiver 100b is established as a normal transmission band for four channels. During channel failure, therefore, the operation rates of the three channels of the transmitter 101 and the receiver 102 opposite thereto are equally increased to establish the transmission band for proper operation.

At the transmission-side transceiver 100a, the data buffers 111 buffer data temporarily, and the switching element 113 distributes data for the one failed channel to the three normally operating channels of the electro/optical signal converting unit 112 and transmits the data. The receiver 102 of the reception-side transceiver 100b receives opto-electrically converted electrical signals using the normally operating three channels. Subsequently, the switching element 123 distributes data among channels so that data for the four channels can be acquired from the received data for the three channels. Data for the properly operating channels is output to the same properly operating channels, while data for the one failed channel is extracted from the data distributed to three channels and is output to the channel corresponding to the failed channel, thereby enabling the data buffers 122 of the reception-side transceiver 100b to reconstruct the data for the four channels and output the reconstructed data. Hence, data transmission using the transmission band established before the occurrence of failure is possible even if a channel fails.

Figure 2:
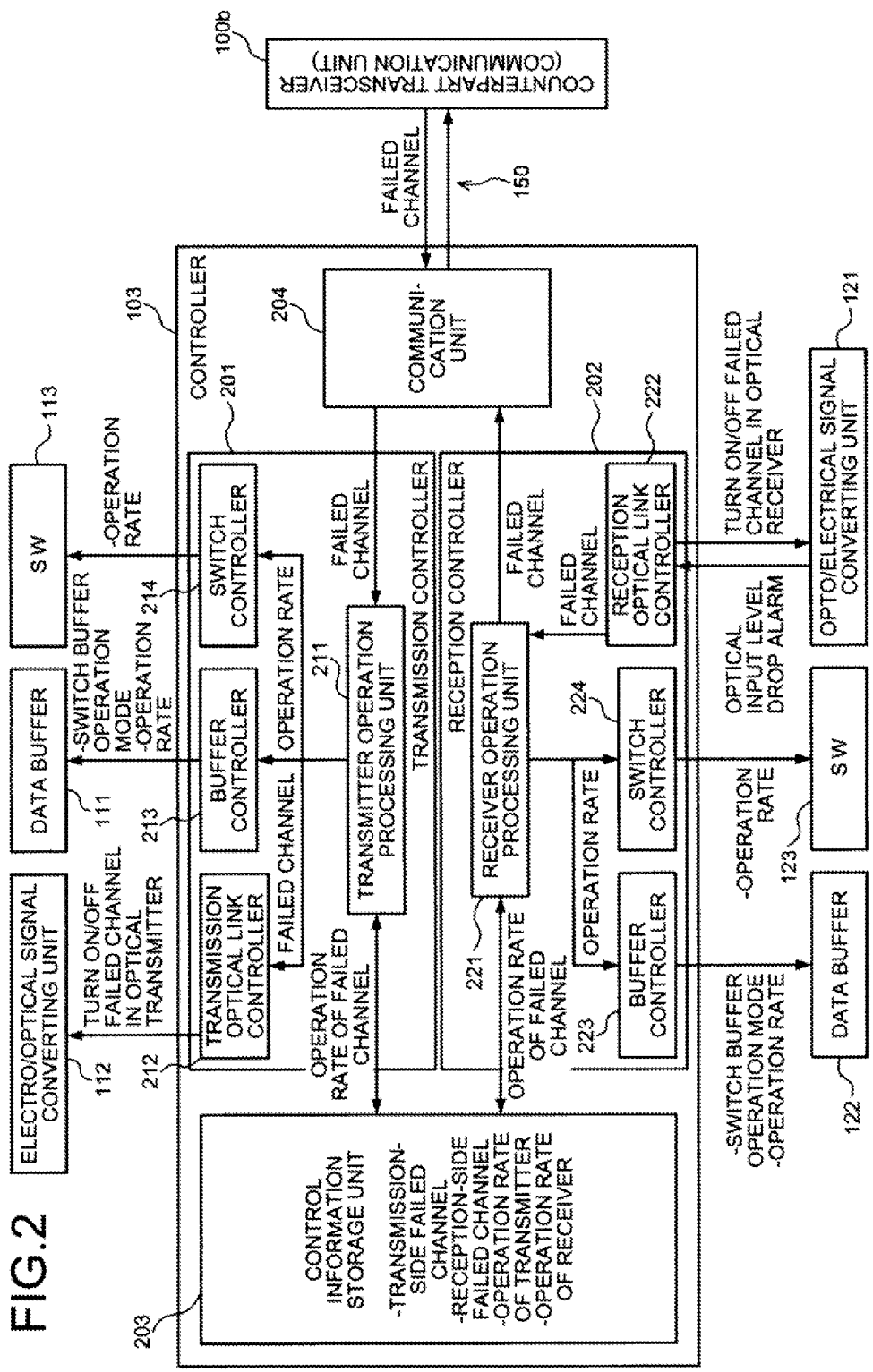
FIG. 2 is a block diagram of functions of a controller.

FIG. 2 is a block diagram of functions of the controller. The controller 103 includes a transmission controller 201, a reception controller 202, a control information storage unit 203, and a communication unit 204. The transmission controller 201 controls data transmission by the transmitter 101. The reception controller 202 controls data reception by the receiver 102. The information storage unit 203 stores information for controlling data transmission/reception. The communication unit 204 performs communication for sending information of a failed channel to the controller 103 of the counterpart transceiver 100b.

The transmission controller 201 includes a transmitter operation processing unit 211, a transmission optical link controller 212, a buffer controller 213, and a switch controller 214. The transmitter operation processing unit 211 controls the transmitter 101 so that data transmission is continued even when a channel failure occurs.

The reception controller 202 includes a receiver operation processing unit 221, a reception optical link controller 222, a buffer controller 223, and a switch controller 224. The receiver operation processing unit 221 controls the receiver 102 so that data reception is continued during both proper operation and in the event of channel failure. When the opto/electrical signal converting unit 121 detects a failed channel, the receiver operation processing unit 221 sends information of the failed channel to the transmitter 101 of the transceiver 100a via the communication unit 204.

The information storage unit 203 stores the operation rate of the transmitter 101 and receiver 102 that correspond to the specified transmission rate (communication speed). When channel failures occur, the information storage unit 203 stores information of the reception-side and the transmission-side failed channels.

The transmitter operation processing unit 211 performs operation setting for proper operation and channel failure, based on information stored in the information storage unit 203. When receiving a notice of a failed channel from the counterpart transceiver 100b via the communication unit 204, the transmitter operation processing unit 211 acquires the operation rate of the failed channel from the information storage unit 203. The transmitter operation processing unit 211 then causes the transmission optical link controller 212 to stop (cut off) data transmission through the failed channel and performs control for continuing data transmission only through the properly operating channels. The transmitter operation processing unit 211 calculates an operation rate in a case of transmitting data for the failed channel using the remaining properly operating channels, based on the specified data rate of the receiver 101 and the number of failed channels, and outputs to the buffer controller 213 and to the switch controller 214, the calculated operation rate for the channel failure state.

The buffer controller 213 performs control for causing the data buffers 111 to operate at the operation rate for the channel failure state. In the same manner, the switch controller 214 performs control for causing the switching element 113 to operate at the operation rate for the channel failure state. During channel failure, the switch controller 214 controls the switching element 113 to distribute data for the failed channel to properly operating channels.

The receiver operation processing unit 221 performs operation setting for proper operation states and for channel failure, based on information stored in the information storage unit 203. When the reception optical link controller 222 receives an optical input level drop alarm from the opto/electrical signal converting unit 121, the reception optical link controller 222 stops (cuts off) data reception through the failed channel while continuing data reception through the remaining properly operating channels, and outputs information of the failed channel to the receiver operation processing unit 221. The receiver operation processing unit 221 sends information of the failed channel to the transmission-side transceiver 100a via the communication unit 204. The receiver operation processing unit 221 then calculates an operation rate for a case of receiving the data for the failed channel using the remaining properly operating channels, based on the specified data rate of the receiver 101 and the number of failed channels, and outputs to the buffer controller 223 and to the switch controller 224, the operation rate calculated for the channel failure.

The buffer controller 223 performs control for causing the data buffers 122 to operate at the operation rate for the channel failure state. In the same manner, the switch controller 224 performs control for causing the switching element 123 to operate at the operation rate for the channel failure state. During the channel failure state, the switch controller 224 controls the switching element 123 to extract data for the failed channel from the data for properly operating channels.

Actually, when a failure occurs, the transmitter 101 of the transmission-side transceiver 100a and the receiver 102 of the reception-side transceiver 100b perform control to cope with the channel failure.

Each of the controllers above includes a CPU, ROM, RAM, etc. The CPU performs overall control over the transceiver 100. The RAM is used as a work area of the CPU. The ROM stores various programs for operating the transceiver 100, which include, for example, an operation program for channel failure. These programs are loaded onto the RAM and are executed by the CPU.

Figure 3:
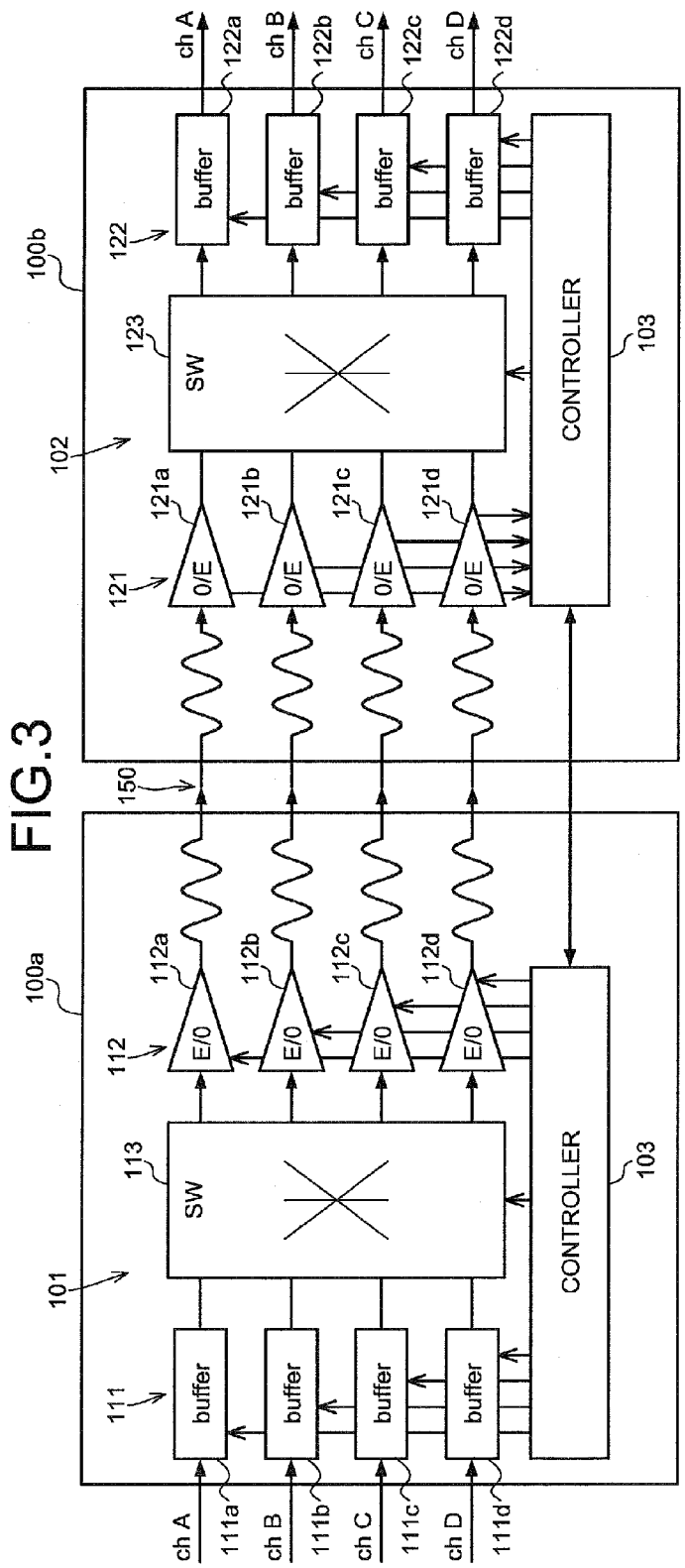
FIG. 3 is an explanatory diagram of data transmission/reception during proper operation.

FIG. 3 is an explanatory diagram of data transmission/reception during proper operation. For convenience, the transmitter 101 is depicted in the transmission-side transceiver 100a and the receiver 102 is depicted in the reception-side transceiver 100b in FIG. 3.

In this manner, a pair of the transceivers 100 (100a, 100b) are arranged as communication counterparts and transmit/receive data in the form of optical signals via the optical transmission path 150, such as an optical fiber. In this configuration of the counterpart transceivers 100a and 100b, the transmitter 101 of the transceiver 100a multiplexes data for multiple channels chA to chD through the optical transmission path 150. The receiver 102 of the reception-side transceiver 100b, thus, receives data for the multiple channels chA to chD. For example, a transmission band for the proper operation is: 5 Gbps×4 ch=20 Gbps.

Proper operation is a state determined to be normal by the controller 103, where no fault occurs in any channel and every channel can perform proper transmission. During proper operation, for example, a digital electrical signal input to the transceiver 100a is stored temporarily in the data buffer 111 (the buffers 111a to 111d) for the respective channel. Data stored in the data buffer 111 is input directly to the switching element 113 downstream from the data buffer 111 without being subject to particular signal processing. During proper operation, the controller 103 does not cause the switching element 113 to execute route switching. The switching element 113, therefore, allows data for each channel to travel therethrough to the electro/optical signal converting unit 112.

When through-output is performed, an incoming electrical signal for each channel is stored temporarily in the data buffer 111 (each of the buffers 111a to 111d), which outputs the signal for each channel directly to the electro/optical signal converting unit 112 (each of the electro/optical signal converting units 112a to 112d) since no channel switching by the switching element 113 is executed. For example, the data buffer 111a for the channel chA outputs a signal directly to the electro/optical signal converting unit 112a for the channel chA since no route switching by the switching element 113 is executed. The electro/optical signal converting unit 112a outputs transmits optical signal data to the receiver of the opposite transceiver 100b. Data transmission through the channels chB to chD is also performed without switching channels.

At the counterpart reception-side transceiver 100b, an incoming optical signal for each channel is converted into an electrical signal by the opto/electrical signal converting unit 121 of the receiver 102. The converted electrical signal from the opto/electrical signal converting unit 121 is output to the data buffer 122 (each of the buffers 122a to 122d) via the switching element 123. During proper operation, in the same manner as the transmitter 101, the switching element 123 does not execute channel switching, so that the electrical signal is output from the data buffer 122 (each of the buffers 122a to 122d) as through-output data.

(Data Transmission/Reception Operation During Channel Failure: 1)

Figure 4:
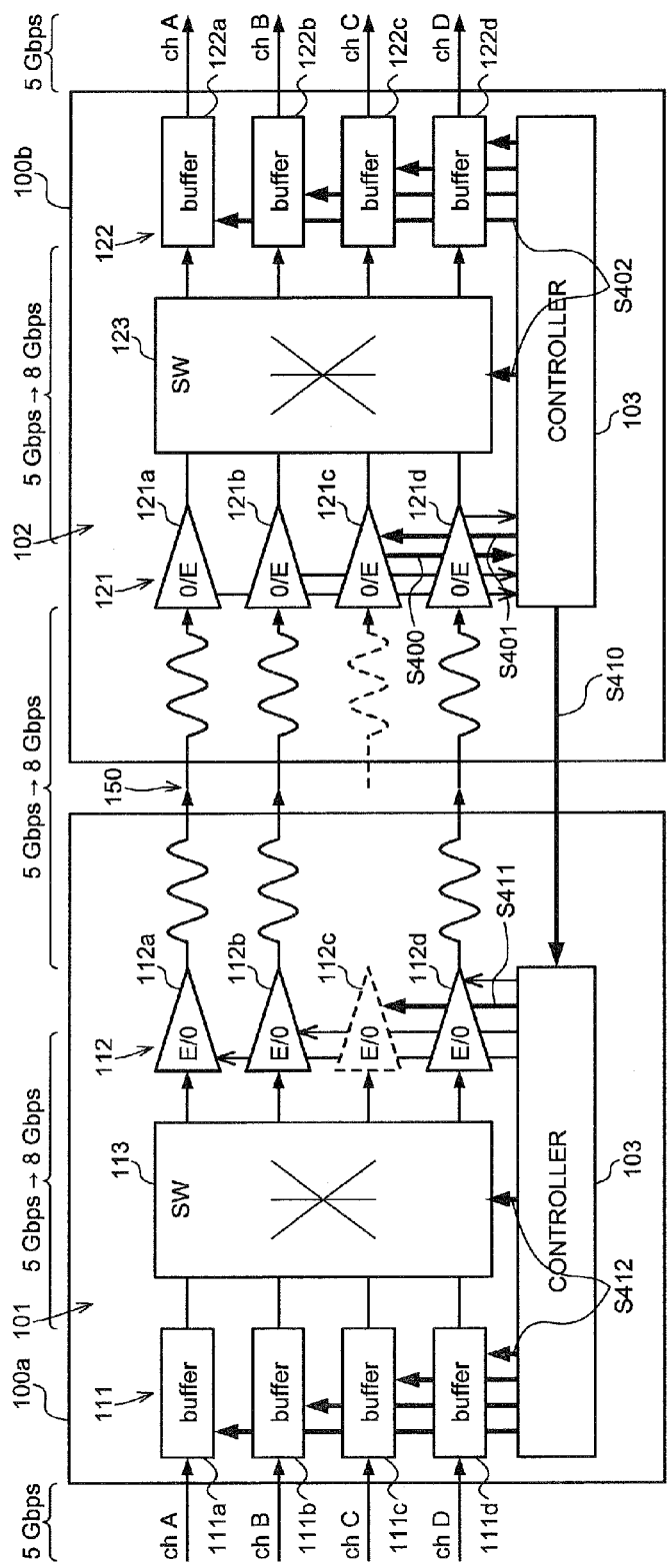
FIG. 4 is an explanatory diagram of data transmission/reception during channel failure.

FIG. 4 is an explanatory diagram of data transmission/reception during channel failure. It is assumed that the data transmission/reception system composed of the pair of transceivers 100a and 100b transmits/receives data at the specified data rate per channel of 5 Gbps (5 Gbps×4 channels). A case where a failure occurs at one channel of the system will be described.

A case is assumed where the optical transmission path 150 of the pair of transceivers 100a an 100b is lost or the light-emitting element (LD, etc.) incorporated in the electro/optical signal converting unit 112 of the transmission-side transceiver 100a fails. FIG. 4 depicts a case where light emission from the electro/optical signal converting unit 112 for the channel chC stops.

As a result, at the reception-side transceiver 100b, the optical input level drops at the channel chC that has failed among channels of the opto/electrical signal converting units 121 of the receiver 102, so that the opto/electrical signal converting unit 121c issues an optical input level drop alarm 5400. The optical input level drop alarm 5400 is issued as, for example, a loss of signal (LOS) alarm. The controller 103 of the reception-side transceiver 100b, via a control signal 5401, stops the opto/electrical signal converting unit 121c for the channel chC that has failed. The controller 103 determines an operation rate for channel failure state, and outputs to the receiver 102 (data buffers 122, switching element 123), a control signal 5402 for changing the operation rate.

The controller 103 of the reception-side transceiver 100b also sends failing channel (chC) information 5410 to the controller 103 of the transmission-side transceiver 100a. This failing channel (chC) information 5410 can be sent by an in-band method using the optical transmission path 150 or by an out-band method using another communication path.

Receiving the failing channel information 5410, the transmission-side transceiver 100a causes the controller 103 to stop, via a control signal 5411, the electro/optical signal converting unit 112c for the channel chC that has failed. The controller 103 determines an operation rate for channel failure state and outputs to the transmitter 101 (data buffers 111, switching element 113), a control signal 5412 for changing an operation rate.

Each of the controllers 103 of the transmission-side transceiver 100a and reception-side transceiver 100b determines an operation rate for channel failure in the same manner. For example, when the specified transmission rate is 5 Gbps, the controller 103 changes control of the component units for the properly operating channels of the transmitter 101 (data buffers 111 and switching element 113) to cause the component units to operate at a higher operation rate (e.g., 8 Gbps) during channel failure. The same operation rate is applied to the receiver 102. For example, a transmission band between the transceivers 100a and 100b is determined to be 8 Gbps×3 channels=24 Gbps for channel failure. In this manner, a transmission band wider than the transmission band used during proper operation (5 Gbps×4 channels=20 Gbps) is established.

At the transmitter 101, the data buffers 111 (111a to 111d) temporarily buffer input data, and the switching element 113 distributes data for the channel chC that has failed to the properly operating channels chA, chB, and chD. As a result, the electro/optical signal converting units 112 (112a, 112b, 112d) output to the optical transmission path 150, data for four channels in the form of optical signals, from the properly operating channels chA, chB, and chD.

At the reception-side transceiver 100b, the opto/electrical signal converting units 121 (121a, 12b, 121d) of the receiver 102 for the properly operating channels chA, chB, and chD receive the optical signals and convert the optical signals into electrical signals. The switching element 123 performs channel switching so that the data for the properly operating channels among the data received from three properly operating channels is output to the properly operating channels while the data for the failed channel among the data for four channels is output to the channel chC that has failed. As a result, the data for all four channels including the failed channel can be output via the data buffers 122 (122a to 122d). Because the receiver 102 operates at the same operation rate (8 Gbps×3 channels=24 Gbps) as the transmitter 101, data transmission using the transmission band established for use during proper operation can be performed.

(Data Transmission/Reception Operation During Channel Failure: 2)

Figure 5:
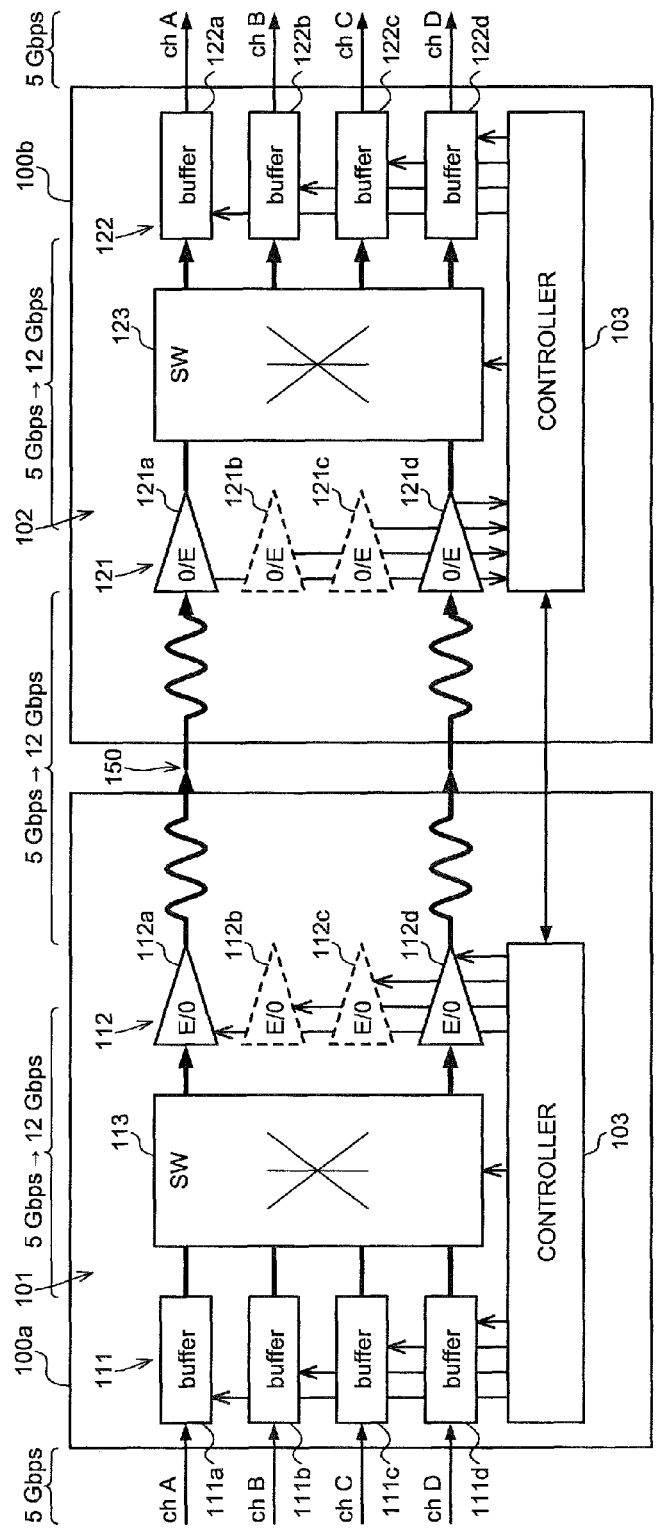
FIG. 5 is another explanatory diagram of data transmission/reception during channel failure.

FIG. 5 is an explanatory diagram of data transmission/reception during channel failure. FIG. 5 depicts a case where failure occurs at two channels chB and chC. In this case, data for the failed channels are distributed to and is transmitted through the remaining two properly operating channels chA and chD. To maintain the overall transmission band of 20 Gbps for proper operation, the transmission rate of the remaining two properly operating channels is determined to be 12 Gbps (to be 10 bps or higher).

FIG. 6 is a sequence diagram of an overall control process executed by the optical communication system when channel failure occurs. This sequence diagram indicates the control processes executed by the transmission-side transceiver 100a and the reception-side transceiver 100b when channel failure occurs. The control processes are those described with reference to FIGS. 4 and 5. In FIG. 6, the same control signals for the control processes as described in FIGS. 4 and 5 are denoted by the same reference numerals used in FIGS. 4 and 5.

As depicted in FIG. 4, when one channel chC fails, each of the controllers 103 of the transmission-side transceiver 100a and the reception-side transceiver 100b stops the channel chC that has failed, and distributes data for the channel chC to the remaining properly operating channels chA, chB, and chD and transmits the data through the remaining properly operating channels chA, chB, and chD. At this time, the operation rate of the properly operating channels chA, chB, and chD is changed (5 Gbps→8 Gbps) to maintain the transmission band for proper operation even during channel failure.

As depicted in FIG. 5, if the channel chB also fails, the two channels chB and chC are in a state of failure. In such a case, as depicted in FIG. 6, the controllers 103 of the transmission-side transceiver 100a and the reception-side transceiver 100b each execute the same process as in the case of the failure of one channel chC. The controller 103 stops the channels chB and chC that have failed, and distributes data for the channels chB and chC to the remaining properly operating channels chA and chD and transmits the data through the remaining properly operating channels chA and chD. At this time, the controller 103 changes the operation rate of the properly operating channels chA and chD (8 Gbps→12 Gbps) by a rate corresponding to a situation where two channels fail.

FIG. 7 is a graph indicating control for changing the transmission rate between the transceivers. In the graph, the horizontal axis represents the number of failed channels and the vertical axis represents the transmission rate. During proper operation where no channel failure occurs, transmission is performed at the specified transmission rate for the state of proper operation. During proper operation, the paired the transmitter 101 of the transceiver 100a and the receiver 102 of the transceiver 100b operate at an operation rate identical to the specified transmission rate.

To secure the transmission band for proper operation even in a case where channel failure occurs, the paired transmitter 101 and receiver 102 are caused to operate at an operation rate higher than the specified transmission rate. During proper operation, the transmission rate of the entire system is given as: transmission rate of entire system=number of properly operating channels×transmission rate of each properly operating channel. To maintain the transmission rate for proper operation even in the event of channel failure, therefore, the transmission rate (operation rate) of the remaining properly operating channels is increased to compensate for the effect of a decrease in the number of properly operating channels. Hence, as depicted in FIG. 7, the transmission rate is increased linearly (changed successively) to cause the paired transmitter 101 and the receiver 102 to operate at a higher operation rate.

Transmission rates indicated in FIG. 7 may be calculated by the controller 103, based on the number of failed channels and the transmission rate stored in the control information storage unit 203 depicted in FIG. 2, or may be stored in advance in the control information storage unit 203 as setting information so that the controller 103 reads a transmission rate corresponding to the number of failed channels from the control information storage unit 203 and changes transmission rate setting.

(Example 1 of Distribution of Data for Failed Channels)

FIG. 8 is a timing chart of an example of distribution of data for a failed channel. In the example depicted in FIG. 8, six channels (chA to chF) are provided, among which one channel chF fails. As depicted in area (a), data for six channels is input to the transceiver 100a, and the data buffer 111 (each of buffers 111a to 111f) for each channel buffers receive an input data for each packet and outputs each packet data at the operation rate for proper operation.

When channel failure occurs, control is performed to increase the transmission rate between the transceivers by a rate corresponding to the number of failed channels. As a result, as depicted in area (b), the transmission period for each packet is shortened by a rate equivalent to the rate of increase of the transmission rate. In areas (a) and (b), a common time axis is adopted. For example, at a buffering completion time t1 at which a period TC31 ends, transmission of a third packet 3 in the channel chC indicated in area (a) is started as transmission of optical transmission data during a shorter period TC32, as depicted in area (b).

In each of the remaining properly operating channels chA to chE, a vacant time slot 107 having no data to transmit is created as a time slot equivalent to the rate of increase of the transmission rate. Data for the channel chF that has failed is transmitted using this vacant slot 701. In the example depicted in FIG. 8, each data packet of the channel chF that has failed is distributed sequentially to the other properly operating channels chA to chE, where the data packet is stored in the vacant slot 701 to be transmitted. The data packet may be distributed to the properly operating channels in descending order or ascending order of numbers for the properly operating channels.

For example, the first packet F-1 in the channel chF is stored to the vacant time slot 701 at the head of the channel chA and is transmitted. Then, the second packet F-2 in the channel chF is stored to the vacant time slot 701 ensuing the first packet B-1 in the channel chB next to the channel chA and is transmitted. Then, the third packet F-3 in the channel chF is stored to the vacant time slot 701 ensuing the third packet C-3 in the channel chC next to the channel chB and is transmitted. Then, the third packet F-4 in the channel chF is stored in the vacant time slot 701 ensuing the third packet D-3 in the channel chD next to the channel chC and is transmitted.

In determining the data transmission timing, if the timing of transmitting data for a failed channel is the same as the timing of transmitting data for a properly operating channel, transmitting the data for the properly operating channel is given priority. The data for the failed channel is transmitted after the end of transmission of the data for the properly operating channel. When timing of transmitting data for the failed channel is different from timing of transmitting data for a properly operating channel, all data is transmitted in sequence with data for which a buffering period is over first to be transmitted.

In the above example, data for the channel chF is distributed sequentially to the channels chA to chE, where the distributed data is stored in each vacant slot, and data for a properly operating channel is transmitted with priority over data for the failed channel. Distribution of data for the failed channel is not limited to the above example and may be performed by a different method. For example, if each properly operating channel has a vacant slot, data for the channel chF that has failed may be distributed to the channel chA, to the channel chD, and to the channel chC in sequence regardless of the order of the properly operating channels.

(Example 2 of Distribution of Data for Failed Channels)

FIG. 9 is a timing chart of an example of data distribution for a failed channel. Areas (a) and (b) in FIG. 9 are equivalent to the areas (a) and (b) in FIG. 8. In area (a) of FIG. 9, it is assumed that the transmission timing (time t1) of the third packet of the channel chC matches that of the third packet of the channel chF. When the channel chF fails, data for the channel chC is transmitted at such a timing as indicated in area (b) where the third packet C-3 of the properly operating channel chC is transmitted first and then the third packet F-3 of the channel chF that has failed is transmitted.

Observing, in area (a), timing of the completion of buffering of the sixth packet of the properly operating channel chA and the same of the sixth packet of the channel chF that has failed reveals that buffering of the sixth packet of the channel chF finishes earlier (at time t2) than buffering of the sixth packet of the properly operating channel chA (at time t3). In this case, in the channel chA, the sixth packet F-6 of the channel chF and for which packet buffering is completed earlier, is transmitted first and then the sixth packet A-6 of the properly operating channel chA is transmitted, as indicated in area (b).

It is assumed that the channel chE also fails and consequently, two channels chF and chE are in a state of failure, as indicated in area (c). In this case, according to the control process depicted in FIG. 6, data for the failed channels chE and chF are distributed to vacant time slots of the remaining four properly operating channels chA to chD and are transmitted.

An increase in the number of failed channels leads to a higher transmission rate. For example, for taking packets D-5 and E-5, the data transmission periods for these packets in area (b) of FIG. 9 become shorter by a rate corresponding to the number of the failed channels and that transmission timing of the packet E-5 is changed from time t4 to time t5 preceding the time t4, as indicated in area (c).

FIG. 10 is a graph of another example of control for changing the transmission rate between the transceivers. While the transmission rate is changed linearly in the example depicted in FIG. 7, the transmission rate may be changed through multiple phases. As indicated in FIG. 10, given ranges of the number of failed channels are set so that a transmission rate is determined for each range. For example, the operation rate of a circuit element like switching element 113 can be changed discretely by internal circuit switching, etc, thereby allowing acquisition of transmission rates corresponding to the phase-dependent operation rates of such a circuit element.

In such a case, the transmission rate at each phase is determined to be a rate at which a transmission band is greater than or equal to the transmission band for the proper operation when the number of failed channels is at maximum. Setting information indicated in FIG. 10 can also be stored in the control information storage unit 203, from which the controller 103 can read a transmission rate corresponding to the number of failed channels and change the setting.

FIG. 11 is timing chart of another example of data distribution for a failed channel. FIG. 11 depicts an example of control based on the phase-dependent transmission rate setting indicated in FIG. 10. Area (a) of FIG. 11 is equivalent to area (a) of FIG. 9. As indicated in area (b), when one channel chF fails, the current transmission rate is changed to a transmission rate at a given phase, and each data packet of the channel chF that has failed is distributed sequentially to other properly operating channels chA to chE, where the data packet is placed in each vacant time slot and is transmitted.

Subsequently, when another channel chE also fails, resulting in two channels in a state of failure, the transmission rate setting of FIG. 10 also applies, as indicated in area (c). In the example of FIG. 10, the same transmission rate is set for both cases of one failed channel and two failed channels. The same transmission rate, therefore, is used when the number of failed channels is two or less. For example, for a packet A-3, the data transmission periods for the packet A-3 indicated in areas (b) and (c) of FIG. 11 are the same and the transmission timing of the packet A-3 is also the same.

The changed transmission rate indicated in area (c) is set to a rate for maintaining the transmission band for proper operation based on the assumption that the number of failed channels is two or less. The transmission rate for a case of one failed channel indicated in area (b) of FIG. 11 is, therefore, higher than the transmission rate indicated in area (b) of FIG. 9. Comparing area (c) of FIG. 11 with area (c) of FIG. 9 reveals that the transmission period for each packet and the transmission timing of the same indicated in area (c) of FIG. 11 are respectively shorter and earlier.

FIG. 12A is an explanatory diagram of an operation of the data buffer of the transmitter during proper operation, depicting the data buffer 111a for the channel chA. During proper operation where no channel failure occurs, the data buffer 111a of the transmitter 101 does not buffer a data packet 1200 of the channel chA and outputs the data packet 1200 as it is.

A case of channel failure will be described. When failure occurs at any one of the channels, the data buffer 111 gives an identifier (header) to each data packet 1200 distributed to the remaining properly operating channels. This identifier is composed of the following two sub-identifiers.
1. Channel identifier 1 indicating the channel to which data for the failed channel is distributed
2. Channel identifier 2 indicating to which channel distributed data originally belongs FIG. 12B is an explanatory diagram of an operation of the data buffer of the transmitter at the time of occurrence of a channel failure. It is assumed that failed channel is the channel chF. Area (a) indicates the data buffer 111a for the properly operating channel chA where no failure occurs. When a failure occurs at the channel chF, at each properly operating channel (chA), the data buffer 111a buffers the input data packet 1200 and gives the identifier to the data packet 1200 as a header. At the properly operating channel chA, information carried by the channel identifier 1 (1201) and information carried by the channel identifier 2 (1202) are the same "A" (representing the channel chA).

Area (b) indicates the data buffer 111f for the channel chF that has failed. The data buffer 111f for the channel chF buffers the input data packet 1200 and gives the identifier to the data packet 1200 as a header. At the channel chF, information carried by the channel identifier 2 (1202) is "F" and information carried by the channel identifier 1 (1201) is changed sequentially to "A" to "E" representing properly operating channels each time the data packet 1200 is output. Following "E" representing the channel chE at the end of changing cycle, "A" representing the channel chA comes again. In this manner, the switching element 113 downstream from the data buffer 111f distributes the data packets 1200 of the failed channel output from the data buffer 111f, to the corresponding channels.

FIG. 13 depicts operation of the switching element of the transmitter. The operation executed by the switching element 113 of the transmitter 101 when the channel chF fails as in the case depicted in FIG. 12B will be described. The data buffers 111 (111a to 111f) upstream to the switching element 113 input into the switching element 113, each of the data packets 1200 of all channels chA to chF including the channel chF that has failed.

The switching element 113 determines a route based on information carried by the channel identifier 1 (1201) given to the data packet 1200 as the header. For example, as indicated in area (a), the data packet 1200 of the channel chB input from an input port B has the channel identifier 1 (1201) carrying information "B" and consequently, this data packet 1200 is output directly from an output port B. In the case of the channel chF that has failed, the data packet 1200 of the channel chF input from an input port F has the channel identifier 1 (1201) carrying information "A" and consequently, the route for this data packet 1200 is switched to an output port A, from which the data packet 1200 is output. As described, the data packets 1200 of the failed channel are distributed sequentially to the channels chA to chE.

Subsequently, as indicated in area (b), the data packet 1200 of the channel chA is input from the input port A and the channel identifier 1 (1201) of the data packet 1200 carries information "A". At the output port of the channel A, however, output of the data packet 1200 of the channel chF is in progress. In such a case, the switching element 113 temporarily saves the data packet 1200 of the channel chA input to the input port A, and stands by until the output port A is available.

As indicated in area (c), when the output port A is available, the switching element 113 outputs the temporarily saved data packet 1200 of the channel chA from the output port A. Then, as indicated in area (d), the data packet 1200 of the channel chF that has failed is input to the input port F. The data packet 1200 of the channel chF has the channel identifier (1201) carrying information "B". However, output of the data packet 1200 of the channel chB is in progress at the output port of the channel chB. The switching element 113, therefore, temporarily saves the data packet 1200 of the channel chF input to the input port F, and stands by until the output port B is available.

As indicated in area (e), when the output port B is available, the switching element 113 outputs the temporarily saved data packet 1200 of the channel chF from the output port B.

FIG. 14 depicts operation of the switching element of the receiver. The operation of the switching element 123 of the transmitter 101 will be described. It is assumed that the failed channel is the channel chF as in the description of the operation of the transmitter. In this case, each of the data packets 1200 of the remaining properly operating channels chA to chE other than the channel chF that has failed is input to the switching element 113.

The switching element 123 determines a route based on information carried by the channel identifier 2 (1202) given to the data packet 1200 as the header. For example, as indicated in area (a), the data packet 1200 of the channel chB input from an input port B has the channel identifier 2 (1202) carrying information "B" and consequently, this data packet 1200 is output directly from an output port B. In the case of the channel chF that has failed, the data packet 1200 of the channel chF input from an input port A has the channel identifier 2 (1202) carrying information "F" and consequently, the route for this data packet 1200 is switched to an output port F, from which the data packet 1200 is output.

Subsequently, as indicated in area (b), the next data packet 1200 of the channel chA is input to the input port A, and the channel identifier 1 (1201) of the data packet 1200 carries information "A". As a result, the data packet 1200 is output from the output port A. In the same manner, the next data packet 1200 of the channel chB is input to the input port B, and the channel identifier 1 (1201) of the data packet 1200 carries information "B". As a result, the data packet 1200 is output from the output port B.

Then, as indicated in area (c), the next data packet 1200 is input to the input port B, and the channel identifier 1 (1201) of the data packet 1200 carries information "F". As a result, the route for this data packet 1200 is switched to the output port F, from which the data packet 1200 is output, as indicated in area (d).

FIGS. 15A and 15B are explanatory diagrams of operation of the data buffer of the receiver, depicting the buffer 122*a* of the channel chA. As indicated in FIG. 15A, during proper operation where no channel failure occurs, the data buffer 122*a* of the receiver 101 does not buffer the data packet 1200 of the channel chA and outputs the data packet 1200 as it is.

A case where failure occurs at any one of the channels will be described with reference to FIG. 15B. When the failure occurs, the switching element 123 disposed upstream to the data buffers 122 (122*a* to 122*d*) returns data packets of all channels including the failed channel back to the channels from which the data packets originate. Therefore, the data buffers 122 (122*a* to 122*d*) buffer the input data packets 1200, discard the channel identifiers 1 (1201) and channel identifiers 2 (1202) from the headers of the data packets 1200, and output the data packets 1200 without the identifiers.

According to the embodiments as described above, even if a failure occurs at one or more channels during proper operation where data transmission is performed using all of multiple channels, data for the failed channel is transmitted using the remaining properly operating channels, so that data for the failed channel can be transmitted continuously without interruption. By transmitting the data at a transmission rate that has been increased by a rate corresponding to the number of failed channels, even if a given channel fails, the normal transmission band can be maintained, thereby enabling establishment of a highly reliable link.

Because providing a backup channel, etc. in advance for system redundancy in preparation for the occurrence of failure is unnecessary, initial costs can be reduced. According to the above methods, a failed channel can be detected and data for the failed channel can be distributed autonomously in the system, thereby enabling the occurrence of a failure to be handled without dependence on the protocol of data to be transmitted and consequently, reducing the load on the transmission system.

According to one embodiment, even if a transmission failure occurs in one channel or multiple channels during data transmission through multiple channels, all data including data for the channel having the failure can be transmitted.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmission apparatus comprising:
  a transmitter that transmits to a counterpart receiver via a transmission path and transmits as optical signals for a plurality of channels, input signals for a plurality of channels; and
  a controller that when a transmission failure between the transmitter and the receiver is detected, distributes to properly operating channels, data for a channel subject to the transmission failure, increases a transmission rate for the properly operating channels to a given transmission rate, and continues data transmission for all channels including the channel subject to the transmission failure, wherein
  the transmitter includes:
    a data buffer provided for each channel;
    a switching element that switches routes of data output from the data buffer; and
    an electro/optical converting element that converts data for a switched route, from electronic data to optical data,
  the data buffer appends a first channel identifier and a second channel identifier to the data for all channels, the first channel identifier indicating a channel to which data for the channel subject to the transmission failure is to be distributed and the second channel identifier indicating to which channel distributed data originally belongs, and
  the switching element switches the routes of the data based on the first channel identifier; and the transmitter divides the data for the channel subject to the transmission failure into given data units and transmits each of the data units, using vacant time slots of the properly operating channels, not occupied by data to be transmitted.

2. The optical transmission apparatus according to claim 1, wherein
the controller determines a transmission band for proper operation to be a product of the number of channels multiplied by the transmission rate per channel, increases the transmission rate for the properly operating channels to the given transmission rate for establishing the transmission band for proper operation, and continues data transmission for all channels including the channel subject to the transmission failure.

3. The optical transmission apparatus according to claim 1, comprising a memory unit storing in advance relations between the number of channels subject to transmission failure and the transmission rate for the properly operating channels, wherein
the controller reads from the memory unit, the transmission rate for the properly operating channels and corresponding to the number of channels subject to the transmission failure, and determines the read transmission rate to be the transmission rate for the properly operating channels in the transmitter.

4. The optical transmission apparatus according to claim 3, wherein
the memory unit stores therein information indicating relations that continuously changed between the number of channels subject to transmission failure and the transmission rate for the properly operating channels.

5. The optical transmission apparatus according to claim 3, wherein
the memory unit stores therein information indicating relations between the number of channels subject to transmission failure and the transmission rate for the properly operating channels, the transmission rate changing discretely relative to the number of channels.

6. The optical transmission apparatus according to claim 1, wherein
the controller receives a notice of transmission failure output from the counterpart receiver via the transmission path as a result of data reception, and performs control for the transmission failure.

7. The optical transmission apparatus according to claim 1, wherein
the transmitter appends an identifier to data for the properly operating channels and to data that is for the channel subject to the transmission failure and distributed to the properly operating channels, and transmits the data with the identifier to the counterpart receiver.

8. The optical transmission apparatus according to claim 1, wherein the transmitter transmits each of the data units in ascending order or descending order of respective channel numbers of the properly operating channels, using the vacant time slots not occupied by data to be transmitted.

9. The optical transmission apparatus according to claim 1, wherein
the transmitter gives priority to transmission of data for the properly operating channels, when transmission timing of data for the properly operating channels matches transmission timing of data for the channel subject to the transmission failure.

10. An optical transmission apparatus comprising:
a receiver that receives from a counterpart transmitter via a transmission path, optical signals for a plurality of channels; and
a controller that when a transmission failure between the transmitter and the receiver is detected, extracts from a properly operating channel, data for a channel subject to the transmission failure, increases a transmission rate of the properly operating channel to a given transmission rate, and continues data transmission for all channels including the channel subject to the transmission failure, wherein
the data for all channels is appended a first channel identifier and a second channel identifier, the first channel identifier indicating a channel to which data for the channel subject to the transmission failure is to be distributed and the second channel identifier indicating to which channel distributed data originally belongs, and
the data for the channel subject to the transmission failure is divided into given data units and each of the data units are transmitted, using vacant time slots of the properly operating channels, not occupied by data to be transmitted.

11. The optical transmission apparatus according to claim 10, wherein
the controller determines a transmission band for proper operation to be a product of the number of channels multiplied by the transmission rate per channel, increases the transmission rate for the properly operating channel to the given transmission rate for establishing the transmission band for proper operation, and continues data transmission for all channels including the channel subject to the transmission failure.

12. The optical transmission apparatus according to claim 10, wherein
the controller receives a notice of a detected transmission failure output from the receiver as a result of data reception, and sends information of the transmission failure to the counterpart transmitter.

13. The optical transmission apparatus according to claim 10, wherein
the receiver, based on an identifier given by the counterpart transmitter to the data that is for the properly operating channel and to the data that is for the channel subject to the transmission failure and distributed to the properly operating channel, identifies the data, returns the data for the channel subject to the transmission failure to the channel from which the data originates, discards the identifier from the data, and outputs the data.

14. The optical transmission apparatus according to claim 10, wherein
the receiver includes:
an opto/electric converting element provided for each channel;
a switching element that switches a route for data converted from optical data into electronic data; and
a data buffer that buffers data for the switched route,
the receiver receives a first channel identifier and a second channel identifier as identifiers appended to data for all channels, the first channel identifier indicating a channel to which data for the channel subject to the transmission failure is distributed and the second channel identifier indicating to which channel distributed data originally belongs,
the switching element switches the route for the data, based on the second channel identifier and returns the data to the channel from which the data originates, and the data buffer discards the first channel identifier and the second channel identifier from data and outputs the data.

15. An optical transmission method comprising:
transmitting from a transmitter to a counterpart receiver via a transmission path and as optical signals for a plurality of channels, input signals for a plurality of channels; and
distributing when a transmission failure between the transmitter and the receiver is detected and distributing to a properly operating channel, data for a channel subject to the transmission failure at the transmitter, increasing a transmission rate for the properly operating channel to a given transmission rate, and causing a controller to continue data transmission for all channels including the channel subject to the transmission failure, wherein
the data for all channels is appended a first channel identifier and a second channel identifier, the first channel identifier indicating a channel to which data for the channel subject to the transmission failure is to be distributed and the second channel identifier indicating to which channel distributed data originally belongs, and
the data for the channel subject to the transmission failure is divided into given data units and each of the data units are transmitted, using vacant time slots of the properly operating channels, not occupied by data to be transmitted.

16. The optical transmission method according to claim 15, wherein
a transmission band for proper operation is determined to be a product of the number of channels multiplied by the transmission rate per channel, and the transmission rate of the properly operating channel is increased to the given transmission rate for establishing the transmission band for proper operation to continue data transmission through all channels including the channel subject to the transmission failure.

17. An optical transmission method comprising:
causing a receiver to receive optical signals that are for a plurality of channels and transmitted from a counterpart transmitter via a transmission path; and
extracting from a properly operating channel, data for a channel subject to a transmission failure, increasing a transmission rate of the properly operating channel to a given transmission rate, and causing a controller to continue data transmission for all channels including the channel subject to the transmission failure, when the transmission failure between the counterpart transmitter and the receiver is detected, wherein
the data for all channels is appended a first channel identifier and a second channel identifier, the first channel identifier indicating a channel to which data for the channel subject to the transmission failure is to be distributed and the second channel identifier indicating to which channel distributed data originally belongs, and
the data for the channel subject to the transmission failure is divided into given data units and each of the data units are transmitted, using vacant time slots of the properly operating channels, not occupied by data to be transmitted.

18. The optical transmission method according to claim 17, wherein
a transmission band for proper operation is determined to be a product of the number of channels multiplied by the transmission rate per channel, and the transmission rate of the properly operating channel is increased to the given transmission rate for establishing the transmission band for proper operation to continue data transmission through all channels including the channel subject to the transmission failure.

* * * * *